(12) United States Patent
Hooli et al.

(10) Patent No.: US 8,681,750 B2
(45) Date of Patent: Mar. 25, 2014

(54) APPARATUS, METHODS, AND COMPUTER PROGRAM PRODUCTS PROVIDING LIMITED USE OF ZADOFF-CHU SEQUENCES IN PILOT OR PREAMBLE SIGNALS

(75) Inventors: Kari Hooli, Oulu (FI); Juha S. Korhonen, Espoo (FI); Kari Pajukoski, Oulu (FI); Esa Tiirola, Kempele (FI)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 12/083,870

(22) PCT Filed: Dec. 28, 2007

(86) PCT No.: PCT/IB2007/004134
§ 371 (c)(1),
(2), (4) Date: Apr. 22, 2010

(87) PCT Pub. No.: WO2008/081311
PCT Pub. Date: Jul. 10, 2008

(65) Prior Publication Data
US 2010/0220664 A1    Sep. 2, 2010

Related U.S. Application Data

(60) Provisional application No. 60/877,854, filed on Dec. 29, 2006, provisional application No. 60/899,861, filed on Feb. 5, 2007.

(51) Int. Cl.
*H04B 7/216* (2006.01)
*H04J 3/00* (2006.01)
*H04W 4/00* (2009.01)

(52) U.S. Cl.
USPC ............ 370/335; 370/336; 370/329; 370/342

(58) Field of Classification Search
USPC ........................................................ 370/335
See application file for complete search history.

(56) References Cited

U.S. PATENT DOCUMENTS

| | | | |
|---|---|---|---|
| 7,706,458 B2 * | 4/2010 | Mody et al. | 375/260 |
| 2002/0064184 A1 * | 5/2002 | Kinoshita et al. | 370/503 |

(Continued)

FOREIGN PATENT DOCUMENTS

| | | |
|---|---|---|
| EP | 2100402 B1 | 11/2011 |
| WO | WO 2008/084381 A1 | 7/2008 |

(Continued)

OTHER PUBLICATIONS

R1-062631, 3GPP TSG RAN WG1 #46bis, Seoul, South Korea, Oct. 9-13, 2006, entitled, "Configurable Cyclic Shift for Non Synchronized Random Access preamble", Texas Instruments.

(Continued)

*Primary Examiner* — Shripal Khajuria
(74) *Attorney, Agent, or Firm* — Harrington & Smith

(57) ABSTRACT

In one, non-limiting exemplary embodiment, a method includes: obtaining a timing uncertainty window parameter; and selecting, using the obtained timing uncertainty window parameter, a preamble sequence including a cyclic shift of a Zadoff-Chu root sequence, wherein the cyclic shift is an allowed cyclic shift from a group of allowed cyclic shifts, wherein the allowed cyclic shifts have timing uncertainty windows with timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

35 Claims, 12 Drawing Sheets

(56) References Cited

U.S. PATENT DOCUMENTS

| | | | |
|---|---|---|---|
| 2002/0118635 A1* | 8/2002 | van Nee | 370/210 |
| 2004/0100939 A1* | 5/2004 | Kriedte et al. | 370/347 |
| 2006/0050799 A1* | 3/2006 | Hou et al. | 375/260 |
| 2007/0058694 A1* | 3/2007 | van Nee | 375/142 |
| 2008/0075184 A1* | 3/2008 | Muharemovic et al. | 375/260 |
| 2008/0080472 A1* | 4/2008 | Bertrand et al. | 370/344 |
| 2008/0101306 A1* | 5/2008 | Bertrand et al. | 370/336 |
| 2008/0123616 A1* | 5/2008 | Lee | 370/344 |
| 2009/0073944 A1* | 3/2009 | Jiang et al. | 370/338 |
| 2009/0225707 A1* | 9/2009 | Baldemair et al. | 370/329 |

FOREIGN PATENT DOCUMENTS

| | | |
|---|---|---|
| WO | WO 2008/100009 A1 | 8/2008 |
| WO | WO 2009/039224 A1 | 3/2009 |

OTHER PUBLICATIONS

R1-063533, 3GPP TSG-RAN WG1 #47 Riga, Latvia, Nov. 6-10, 2006, entitled, "Non-synchronized RACH in Support of High-Speed UEs: Performance Analysis", Lucent Technologies.

R1-063214, 3GPP TSG RAN WG1 #47, Riga, Latvia, Nov. 6-10, 2006, entitled "Non Synchronous Random Access Design for High Doppler Conditions", Texas Instruments.

R1-070226, 3GPP TSG RAN WG1 #47bis, Sorrento, Italy, Jan. 15-19, 2007, "Non-synchronized Random Access Design under Frequency Offset", LG Electronics.

R1-070227, 3GPP TSG RAN WG1 #47bis, Sorrento, Italy, Jan. 15-19, 2007, "Ways to Mitigate Frequency Offset with CAZAC Cyclic Shift", LG Electronics.

R1-070377, 3GPP TSG RAN WG1 #47bis, Sorrento, Italy, Jan. 15-19, 2007, "Restricted Sets of RACH Preamble Signatures for Environments with High Doppler Shifts", Nokia.

* cited by examiner

TO FIG.10B

IF A NEGATIVE FREQUENCY OFFSET IS ESTABLISHED, THE 3$^{RD}$ SET OF CORRELATION VALUES IS USED IN THE FINAL TIMING AND RECEIVED SIGNAL POWER ESTIMATION, WHILE IF A POSITIVE FREQUENCY OFFSET IS ESTABLISHED, THE 2$^{ND}$ SET OF CORRELATION VALUES IS USED IN THE FINAL TIMING AND RECEIVED SIGNAL POWER ESTIMATION, WHILE IF NO FREQUENCY OFFSET IS ESTABLISHED, THE 1$^{ST}$ SET OF CORRELATION VALUES IS USED IN THE FINAL TIMING AND RECEIVED SIGNAL POWER ESTIMATION.

APPARATUS, METHODS, AND COMPUTER PROGRAM PRODUCTS PROVIDING LIMITED USE OF ZADOFF-CHU SEQUENCES IN PILOT OR PREAMBLE SIGNALS

CROSS REFERENCE TO RELATED APPLICATIONS

This patent application claims priority from PCT application no. PCT/IB2007/004134, filed on Dec. 28, 2007, which claims priority from U.S. Provisional Patent Application No. 60/877,854, filed on Dec. 29, 2006, and U.S. Provisional Patent Application No. 60/899,861, filed on Feb. 5, 2007, the disclosures of which are incorporated by reference herein in their entirety.

TECHNICAL FIELD

The exemplary and non-limiting embodiments of this invention relate generally to wireless communication systems, methods, devices and computer program products and, more specifically, relate to techniques for transmission and detection of a pilot sequence or a preamble, such as a preamble in an uplink random access channel, or other synchronization or reference signals.

BACKGROUND

Various abbreviations that appear in the following description and in the Figures are defined as follows:

| | |
|---|---|
| 3GPP | third generation partnership project |
| CAZAC | constant amplitude zero autocorrelation |
| CP | cyclic prefix |
| DFT | discrete Fourier transform |
| eNB | E-UTRAN Node-B, evolved Node-B |
| E-UTRAN | evolved universal terrestrial radio access network |
| IDFT | inverse DFT |
| LTE | long term evolution of UTRAN (E-UTRAN) |
| Node-B | base station |
| OFDMA | orthogonal frequency division multiple access |
| RACH | random access channel |
| UE | user equipment, such as a mobile station or mobile terminal |
| UL | uplink (UE to Node-B) |
| UTRAN | universal terrestrial radio access network |
| ZC | Zadoff-Chu |

In E-UTRAN standardization of 3GPP there have been extensive discussions related to the non-synchronized RACH preamble structure. The Zadoff-Chu CAZAC sequence has been agreed upon as a preamble sequence for LTE UL. Its ideal periodic autocorrelation properties have been seen as beneficial for use as the RACH preamble, for example, multiple preambles are obtained from a single base Zadoff-Chu sequence with cyclic shifts of the sequence. Zadoff-Chu sequences of odd length are given by:

$$a_u(k) = \exp\left(-j2\pi u \frac{qk + (k^2+k)/2}{N_G}\right),$$

where q is an integer and the sequence index u defines the base sequence. In the following, $$a_{u,d}(k) = a_u(k-d \bmod N_G)$$

refers to the d th cyclic shift of sequence $a_u$. These sequences were under previous consideration for E-UTRAN.

The multiple access scheme of the LTE UL is single carrier frequency division multiple access (SC-FDMA) combined with time division resource allocations (TDMA). A part of the frequency and time resources are reserved for transmission of random access preambles. The current working assumptions in 3GPP are that the RACH preamble is transmitted on a 1.08 MHz bandwidth and 64 preambles are used in each cell. A preamble, preceded by a cyclic prefix, consists of a single 0.8 ms Zadoff-Chu sequence, repeated in burst formats 2 and 3 of frame structure type 1, and followed by a guard period. Instead of a single 0.8 ms Zadoff-Chu sequence, a repetition of a 0.4 ms Zadoff-Chu sequence (thus totaling 0.8 ms) was also considered. In the current working assumptions, the cyclic shifts available for the preamble are restricted in environments with high velocity terminals. In the following, the length of the Zadoff-Chu sequence is designated with Ts.

Reference may be had to R1-070377, 3GPP TSG RAN WG1 #47bis, Sorrento, Italy, Jan. 15-19, 2007, "Restricted sets of RACH preamble signatures for environments with high Doppler shifts", Nokia.

Alternative ways of generating the single carrier preamble signal are shown in FIG. 6. The Scheme A is for time domain processing and the Schemes B and C for frequency domain processing. LTE is likely to adopt scheme B. The processing in Scheme B is in accordance with the DFT-S-OFDMA system used for transmission on the scheduled resources, while Scheme C simplifies processing compared with Scheme B. The filtering blocks in B and C may not be present in the final system.

The properties of preamble detections due to frequency offset can be described as follows.

The $N_G$ cyclic shifts of a Zadoff-Chu sequence can be seen as an orthogonal base of $N_G$-dimensional space.

A frequency offset of 1/Ts, where Ts is the duration of the preamble, rotates the transmitted sequence from the original direction to the direction of another cyclic shift B. As a result, the received sequence is orthogonal with the transmitted one. The cyclic shift B depends on the sign of frequency offset as well as on the u-index of the sequence.

When the frequency offset is less than 1/Ts, the rotation is not restricted to the plane defined by the original sequence and the cyclic shift B. However, the largest components are in these directions.

The cyclic shifts of $a_{u,d}(k)$ that correspond to the +/−1/Ts frequency offsets are $a_{u,(d+c_{off} \bmod N_G)}(k)$ and $a_{u,(d-c_{off} \bmod N_G)}(k)$, respectively. When the preamble is defined in the time domain (Schemes A and B in FIG. 6), the cyclic shift offset is given by $c_{off}=(N_G m-1)/u$, where m is the smallest positive integer for which $c_{off}$ is integer. On the other hand, if the preamble is defined in the frequency domain, i.e., transmission is according to the Scheme C in FIG. 6, the cyclic shift offset $c_{off}=u$. In the case of Scheme C of FIG. 6, $a_u(k)=$IDFT $(A_u(n))$, where IDFT( ) is inverse discrete Fourier transformation, and $$A_u(n) = \exp\left(-j2\pi u \frac{qn + (n^2+n)/2}{N_G}\right).$$

In the following denote $\{a_{u,(d-c_{off} \bmod N_G)}(k), a_{u,d}(k) a_{u,(d+c_{off} \bmod N_G)}(k)\}$ a cyclic shift triplet of $a_{u,d}(k)$, and refer to $\{a_{u,(d-c_{off} \bmod N_G)}(k), a_{u,(d+c_{off} \bmod N_G)}(k)\}$ as a frequency cyclic shift pair of $a_{u,d}(k)$, since they are obtained from $a_{u,d}(k)$ by performing a cyclic shift of +−1 in the frequency domain. A frequency cyclic shift means that a cyclic shift is done to the frequency domain presentation of a sequence.

In other words, a frequency cyclic shift of +/−1 for $a_{u,d}(k)$ is the cyclic shift of the root sequence $a_u(k)$, that is equal up to a phase rotation with the sequence obtained when the phase of elements of sequence $a_{u,d}(k)$ are rotated corresponding to a frequency offset of +/−1/Ts, correspondingly. A frequency cyclic shift of +/−1 may also be given by a cyclic shift offset $c_{off}$, $a_{u,(d+c_{off} \bmod N_G)}(k)$ and $a_{u,(d-c_{off} \bmod N_G)}(k)$, correspondingly When detecting a RACH preamble $a_{u,cs_n}(k)$, that is, the $cs_n$th cyclic shift of a Zadoff-Chu sequence $a_u(k)$, the cyclic shifts $a_{u,cs_n}(k), \ldots, a_{u,cs_n+D-1}(k)$ corresponding to a timing uncertainty window are examined. The width of timing uncertainty window D is related to the maximum expected round trip propagation delay and channel delay spread. This set of $a_{u,cs_n}(k), \ldots, a_{u,cs_n+D-1}(k)$ cyclic shifts is referred to as the timing uncertainty window of the preamble $a_{u,cs_n}(k)$ in the following and is distinct for each preamble.

Different RACH preamble detection methods are considered in R1-063214, 3GPP TSG RAN WG1 #47, Riga, Latvia, Nov. 6-10, 2006, entitled: Non Synchronous Random Access Design for High Doppler Conditions", Texas Instruments.

Reference can also be made to R1-070226, 3GPP TSG RAN WG1 #47bis, Sorrento, Italy, Jan. 15-19, 2007, "Non-synchronized Random Access Design under Frequency Offset", LG Electronics, and to R1-070227, 3GPP TSG RAN WG1 #47bis, Sorrento, Italy, Jan. 15-19, 2007, "Ways to Mitigate Frequency Offset with CAZAC Cyclic Shift", LG Electronics.

SUMMARY

In an exemplary embodiment of the invention, a method includes: obtaining a timing uncertainty window parameter; and selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

In an exemplary embodiment of the invention, a program storage device readable by a machine, tangibly embodying a program of instructions executable by the machine for performing operations, said operations comprising: obtaining a timing uncertainty window parameter; and selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

In an exemplary embodiment of the invention, an apparatus includes: a receiver configured to receive a timing uncertainty window parameter; and a processor configured to select, using the received timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

In an exemplary embodiment of the invention, an apparatus includes: means for obtaining a timing uncertainty window parameter; and means for selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIGS. 10A, 10B and 10C, collectively referred to as FIG. 10, depict a logic flow diagram that is illustrative of a method, and the execution of a computer program product, in accordance with exemplary embodiments of this invention.

DETAILED DESCRIPTION

The exemplary embodiments of this invention relate to the UL of the UTRAN LTE (E-UTRAN), and more specifically to the provision of a non-synchronized RACH preamble, and even more specifically to a RACH preamble sequence that allows for reliable preamble detection in terms of detection and false alarm probabilities in the presence of frequency offset and Doppler spread.

Figure 4:
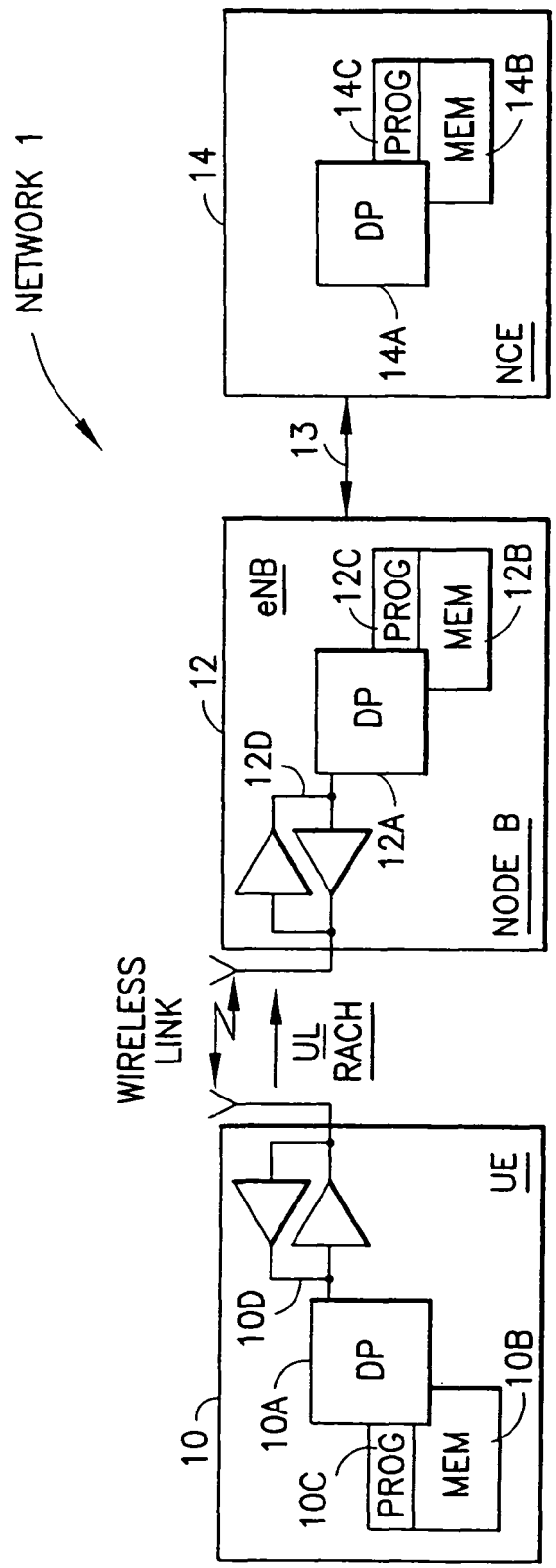
FIG. 4 shows a simplified block diagram of various electronic devices that are suitable for use in practicing the exemplary embodiments of this invention.

Reference is made first to FIG. 4 for illustrating a simplified block diagram of various electronic devices that are suitable for use in practicing the exemplary embodiments of the invention. In FIG. 4, a wireless network 1 is adapted for communication with a UE 10 via a Node-B (base station) 12. The network 1 may include a network control element (NCE) 14, such as an aGW. The UE 10 includes a data processor (DP) 10A, a memory (MEM) 10B that stores a program (PROG) 10C, and a suitable radio frequency (RF) transceiver 10D for bidirectional wireless communications with the Node-B 12, which also includes a DP 12A, a MEM 12B that stores a PROG 12C, and a suitable RF transceiver 12D. The Node-B 12 is coupled via a data path 13 to the NCE 14 that also includes a DP 14A and a MEM 14B storing an associated PROG 14C. At least one of the PROGs 10C, 12C and 14C is assumed to include program instructions that, when executed by the associated DP, enable the electronic device to operate in accordance with the exemplary embodiments of this invention, as will be discussed below in greater detail.

Note that the PROG 14C of the NCE 14 may also be involved, as signatures are divided between the cells in the network taking into account the limitations on the cyclic shifts. That is, aspects of this invention are also applicable to network planning, as the RACH (or other) signature resources (suitable basic sequence indices and cyclic shifts of the sequences) need to be allocated into the cells of the network in a controlled manner.

As such, the exemplary embodiments of this invention may be implemented at least in part by computer software executable by the DP 10A of the UE 10, by the DP 12A of the Node-B 12 and/or by the DP 14A of the NCE 14, or by hardware, or by a combination of software and hardware.

In general, the various embodiments of the UE 10 can include, but are not limited to, mobile terminals, mobile phones, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMS 10B, 12B and 14B may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

It has been noted that the autocorrelation properties of the Zadoff-Chu sequence deteriorate significantly with a large frequency offset between the UE 10 and the Node-B 12 transceivers 10D, 12D. There can appear side correlation peaks which may be found to be even larger than the main correlation peak. The relative location of the side correlation peaks depends on the sequence index u. Since the cyclic shifts of a Zadoff-Chu sequence are used as different preambles, the false alarm rate is increased with increasing frequency offset, where a false alarm means that a preamble transmission also triggers detection of another preamble. The main correlation peak also diminishes with increasing frequency offset, thereby increasing the missed detection probability.

The problems related to preamble detection due to frequency offset may be summarized as follows:

$N_G$ cyclic shifts of a Zadoff-Chu sequence can be seen as an orthogonal base of $N_G$-dimensional space.

A frequency offset of 1/Ts rotates the transmitted sequence from the original direction to the direction of another cyclic shift B, where Ts is the length of the sequence. As a result, the received sequence is orthogonal to the transmitted one. The cyclic shift B depends on the sign of frequency offset as well as on the u-index of the sequence.

When the frequency offset is less than 1/Ts, the rotation is not restricted to the plane defined by the original sequence and the cyclic shift B. However, the largest components are in these directions.

Figure 6:
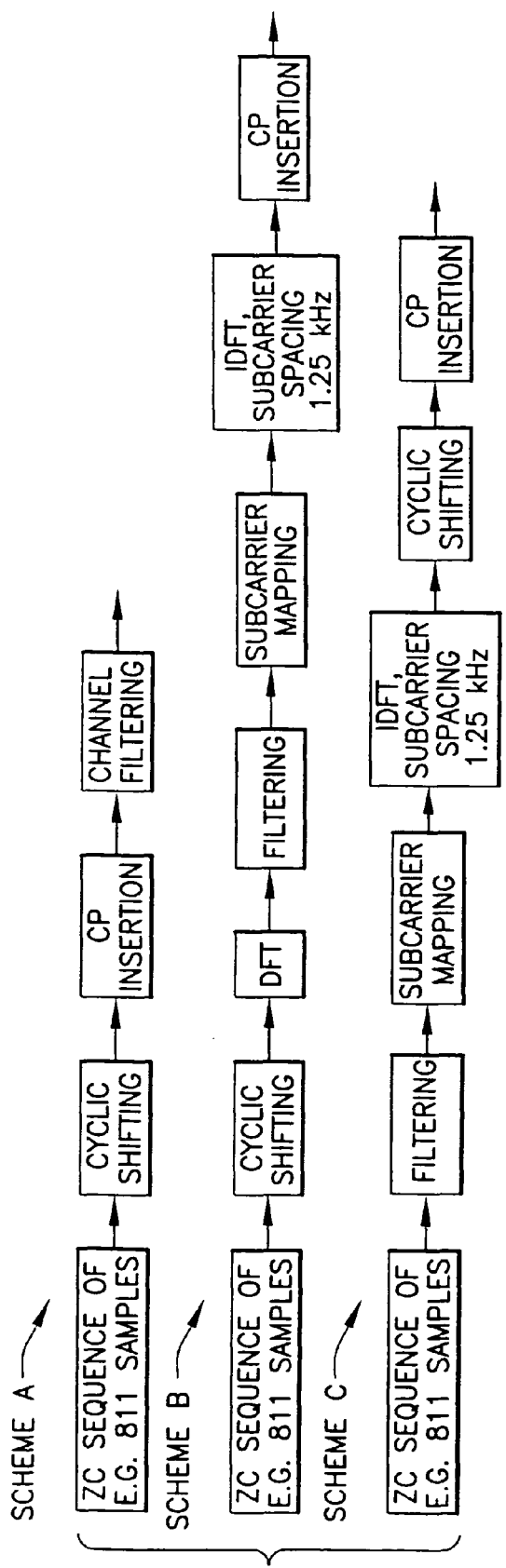
FIG. 6 illustrates a time domain (Scheme A) and two frequency domain (Schemes B and C) implementations of preamble generation.

It can be observed that the cyclic shifts of $a_{u,d}(k)$ that correspond to the +/−1/Ts frequency offsets are $a_{u,(d+c_{off} \bmod N_G)}(k)$ and $a_{u,(d-c_{off} \bmod N_G)}(k)$, respectively. If the transmission is according to the Scheme A or B of FIG. 6, the cyclic shift offset is given by $c_{off}=(N_G m-1)/u$, where m is smallest positive integer for which $c_{off}$ is integer. On the other hand, if the transmission is according to the Scheme C of FIG. 6, the cyclic shift offset $c_{off}=u$. In the case of Scheme C of FIG. 6, $a_u(k)=IDFT(A_u(n))$, where IDFT( ) is the inverse discrete Fourier transformation, and $$A_u(n) = \exp\left(-j2\pi u \frac{qn + (n^2 + n)/2}{N_G}\right).$$

In the following, we denote $\{a_{u,(d-c_{off} \bmod N_G)}(k), a_{u,d}(k), a_{u,(d+c_{off} \bmod N_G)}(k)\}$ as a cyclic shift triplet of $a_{u,d}(k)$. We refer $\{a_{u,(d-c_{off} \bmod N_G)}(k), a_{u,(d+c_{off} \bmod N_G)}(k)\}$ as a frequency cyclic shift pair of $a_{u,d}(k)$ since they are equal up to a phase rotation with the frequency domain cyclic shift of +/−1 of $a_{u,d}(k)$. A frequency cyclic shift means that a cyclic shift is performed on the frequency domain presentation of a sequence.

When detecting a RACH preamble $a_{u,cs_n}(k)$, that is, the $cs_n$th cyclic shift of Zadoff-Chu sequence $a_u(k)$, the cyclic shifts $a_{u,cs_n}(k), \ldots, a_{u,cs_n+D-1}(k)$ corresponding to timing uncertainty are examined. Parameter D is related to the maximum expected round trip propagation delay and channel delay spread. This set of $a_{u,cs_n}(k), \ldots, a_{u,cs_n+D-1}(k)$ cyclic shifts is referred to as a timing uncertainty window of preamble $a_{u,cs_n}(k)$ in the following.

The exemplary embodiments of this invention beneficially limit the cyclic shifts of sequence $a_u(k)$ that can be used as the RACH preamble so that: (A) the frequency cyclic shift pairs of each timing uncertainty window element are not in the timing uncertainty window of any RACH preamble; and (B) the frequency cyclic shift of −1 of each timing uncertainty window element is different from the frequency cyclic shifts of +1 of all timing uncertainty window elements. It should be noted that in addition to limiting the number of cyclic shifts, the points (A) and (B) may mean that some base sequence indexes u can be forbidden. For these forbidden u, the frequency cyclic shift pairs would be within the timing uncertainty window of the same preamble. Points (A) and (B) are new conditions that are used in addition to the conventional constraint that timing uncertainty windows are distinct for each preamble.

Figure 1:
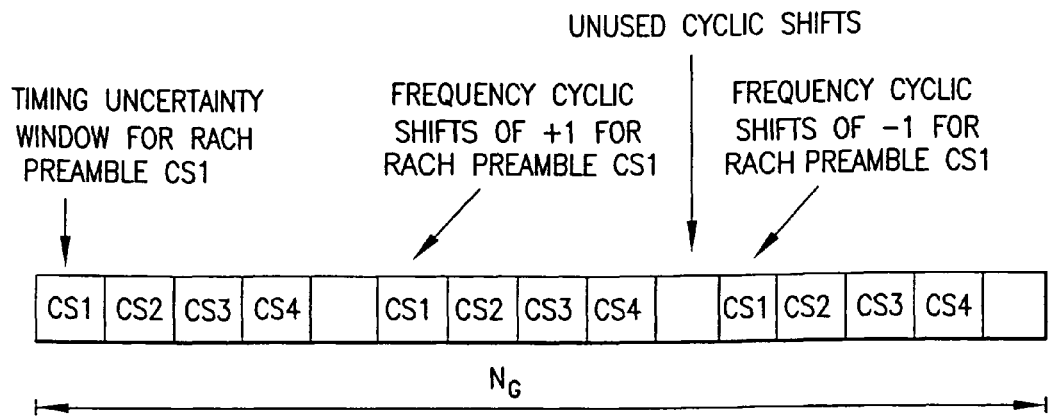
FIG. 1 illustrates limitations on the use of cyclic shifts of a single Zadoff-Chu sequence, where the X-axis refers to the cyclic shift of the sequence.

In other words, the timing uncertainty windows of all allowed cyclic shifts are separate from the corresponding sets of frequency cyclic shift pairs. Also, the frequency cyclic shifts of −1 of timing uncertainty window elements are separate from the frequency cyclic shifts of +1 of timing uncertainty window elements. The use of cyclic shifts of a single sequence is illustrated in FIG. 1.

The exemplary embodiments of this invention also use the correlation values of corresponding frequency cyclic shift pairs, in addition to the correlation values in the timing uncertainty window in the RACH preamble detection.

The selection of cyclic shifts for RACH preamble is straightforward, and can include at least two variants of the selection method.

In a first selection method the preamble cyclic shifts are selected from a candidate list which contains cyclic shifts 0, D, 2D, 3D, . . . , and the selection of the cyclic shifts begins with cyclic shift 0.

In a second selection method the preamble cyclic shift selection begins from cyclic shift 0 and, at each selection, the availability of corresponding cyclic shifts for the timing uncertainty window and its frequency cyclic shift pairs are tested and, if available, are reserved. The selection of a next preamble cyclic shift begins from the next available cyclic shift.

It is the task of the NCE 14 to control the use of base sequence indexes u in the cells of the network. As already discussed in 3GPP, a preferred technique is that different base sequence indexes u are used in closely located cells.

One technique to accommodate the limitations in the cyclic shifts in accordance with exemplary embodiments of this invention is for the NCE 14 to inform the Node-B 12 of the available indexes u and the allowed cyclic shifts. The Node-B 12 then broadcasts this information to the UE 10 as a part of the System Information. Another technique, shortening the System Information in a typical case, is that the first, second or other cyclic shift selection method is known by the UE 10, Node-B 12, and NCE 14. In this case then the NCE 14 provides for each cell the set of indexes u and the width of the timing uncertainty window. The Node-B 12 forwards this information to the UE 10 as a part of the System Information. The UE 10 and Node-B 12 then calculate the available cyclic shifts using the common rule known to each. Yet another technique, also reducing the amount of System Information, is that the NCE 14 provides for the System Information the width of the timing uncertainty window and only one index u. The UE 10 and Node-B 12 calculate the available cyclic shifts, adding new consecutive indexes u until the total number of sequences equals a value specified by a standard or by the System Information.

The foregoing three techniques are exemplary, and should not be construed as imposing any limitation on the process for the NCE 14 to provide the needed information to the Node-B 12 and thus to the UE 10.

At the receiver (e.g., the Node-B 12), the correlation values of the cyclic shift triplet may be combined either coherently or non-coherently. The detection threshold may also be adjusted based on the comparison of cyclic shift triplet correlation values at the tentatively detected peaks. An exemplary reception/detection algorithm contains following steps (reference can also be had to FIG. 5):

5A: Correlate the received signal with Zadoff-Chu sequence;

5B: Estimate the level of noise and interference;

5C: Tentatively detect a first set of peaks from the delays within the timing uncertainty window;

5D: Non-coherently combine correlation values over the cyclic shift triplet for each delay within the timing uncertainty window, and tentatively detect a second set of peaks from the combined correlations;

5E: For the tentatively detected peaks, calculate the ratio between the respective correlation values on the timing uncertainty window and on the frequency cyclic shift pairs. If any of the ratios is sufficiently close to one and the corresponding correlation values are significantly larger than the threshold, the thresholds are increased for both sets of tentatively detected peaks; and

5F: The preamble is detected if the tentatively detected peaks exceed the updated threshold in either of the sets.

Figure 5:
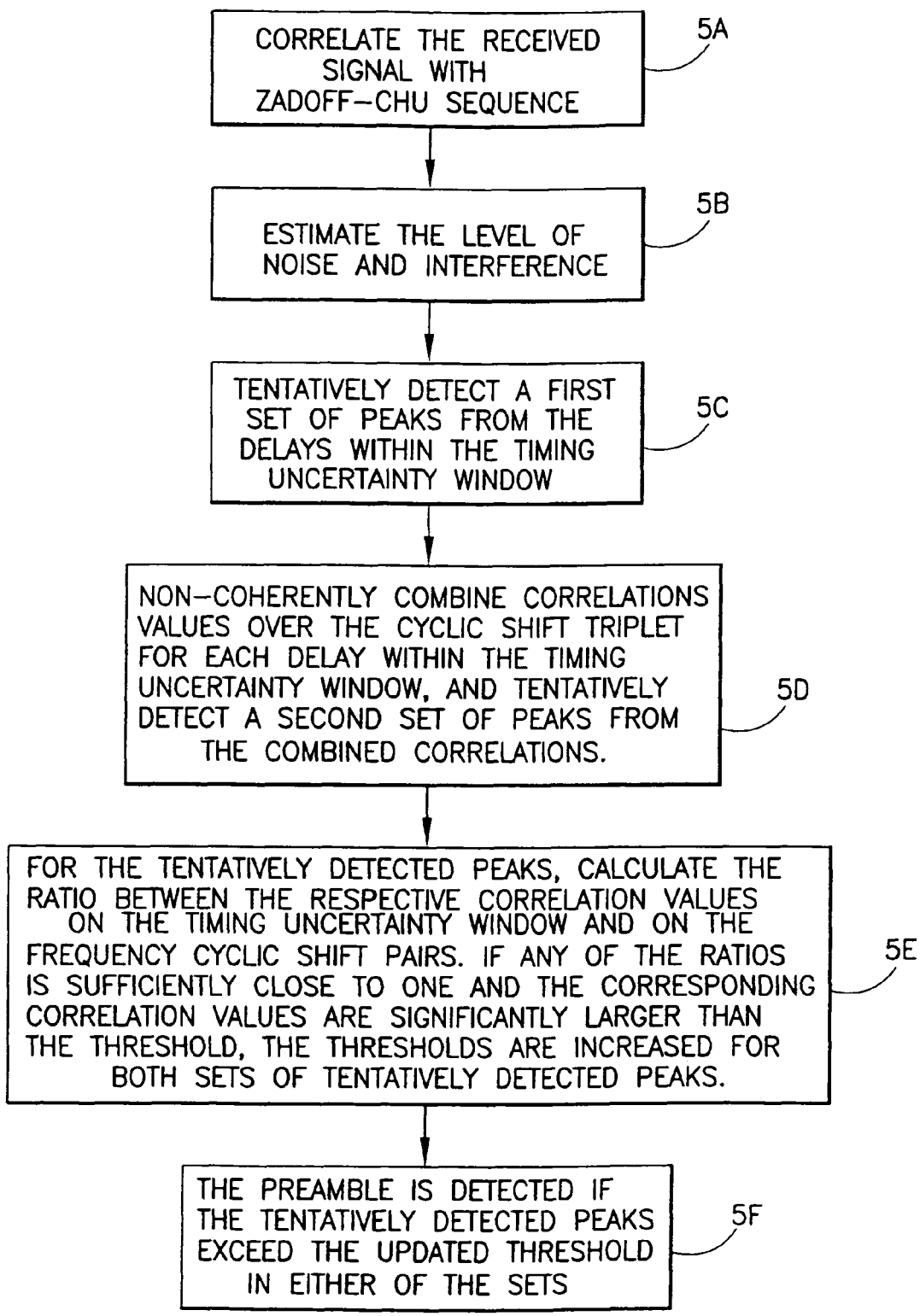
FIG. 5 is a logic flow diagram that is illustrative of a method and the execution of a computer program product to provide an exemplary RCH preamble reception/detection algorithm.

Note that the various blocks shown in FIG. 5 may be viewed as method steps, and/or as operations that result from operation of computer program code, and/or as a plurality of coupled logic circuit elements constructed to carry out the associated function(s), such as may be found in an integrated circuit.

The use of the exemplary embodiments of this invention reduces the false alarm rate and improves the detection probability for the RACH transmission of UEs 10, including high velocity UEs.

Figure 2:
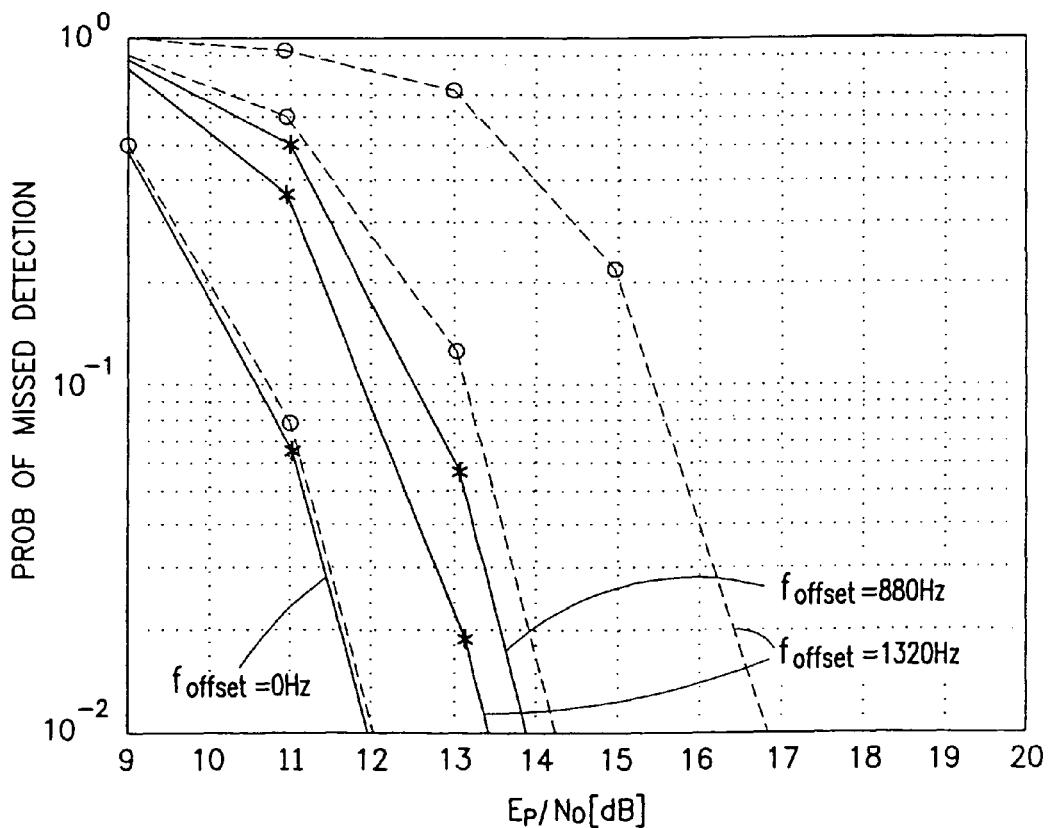
FIG. 2 is a graph that shows the results of simulations conducted to determine the probability of missed detection for a 0.8 ms sequence with cyclic shift limitations (solid lines) and for a 2×0.4 ms sequence without cyclic shift limitations (dashed lines).
Figure 3:
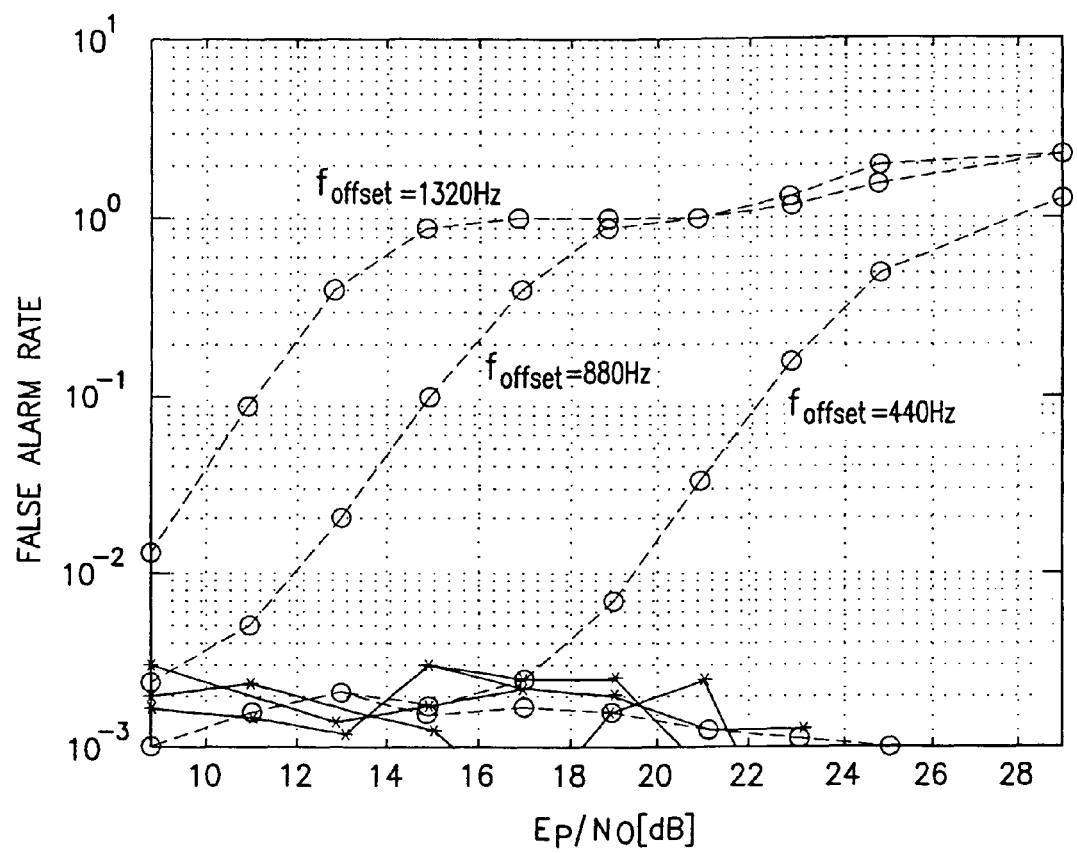
FIG. 3 is a graph that shows the results of simulations conducted to determine the false alarm rate for the 0.8 ms sequence with cyclic shift limitations (solid lines) and for the 2×0.4 ms sequence without cyclic shift limitations (dashed lines).

Missed detection and false alarm rates are presented in FIGS. 2 and 3, respectively. In these Figures a simple one-path line of sight channel is assumed, and frequency offset is set to twice the Doppler frequency. Thus, frequency offsets of 440 Hz, 880 Hz, and 1360 Hz correspond to 120 km/h, 240 km/h, and 360 km/h UE 10 velocities, respectively. A false alarm rate greater than 1 means that more than one preamble out of 64 are wrongly detected on average. The results are presented for the 0.8 ms sequence with the limitation of cyclic shifts (solid lines), as well as for repetition of 0.4 ms sequence with non-coherent combining over the repeated sequence (dashed lines). It can be seen that the use of the exemplary embodiments of this invention provides significant gains in the considered simulation case. The gains are even larger if compared to the 0.8 ms sequence, without cyclic shift limitations.

Based on the foregoing it should be apparent that the exemplary embodiments of this invention provide a method, apparatus and computer program product(s) to limit the cyclic shifts of sequence $a_u(k)$ that can be used as a preamble such that the frequency cyclic shift pairs of each timing uncertainty window element are not in the timing uncertainty window of any preamble, and such that the frequency cyclic shift of −1 of each timing uncertainty window element is different from the frequency cyclic shifts of +1 of all timing uncertainty window elements. That is, the exemplary embodiments of this invention provide a method, apparatus and computer program product(s) wherein the timing uncertainty windows of all allowed cyclic shifts are separate from the corresponding sets of frequency cyclic shift pairs, and where the frequency cyclic shifts of −1 of timing uncertainty window elements are separate from the frequency cyclic shifts of +1 of timing uncertainty window elements.

It is important to note that the preamble referred to in the previous paragraph can be a signal that is transmitted on a RACH. It can also be any other synchronization signal used for determining timing, or that serves as a reference for data detection. In the case of such other synchronization or reference signals, the exemplary embodiments of this invention may use only those base sequence indexes u whose frequency cyclic shift pairs are outside of the timing uncertainty window.

The exemplary embodiments of this invention further provide a method, apparatus and computer program product(s) that employ the correlation values of corresponding frequency cyclic shift pairs, in addition to the correlation values in the timing uncertainty window in a preamble detection process, such as a RACH preamble detection process.

The exemplary embodiments of this invention further provide a method, apparatus and computer program product(s) provide a selection method and variants thereof, where preamble cyclic shifts are selected from the candidate list which contains cyclic shifts $0, D, 2D, 3D, \ldots$, and the selection of the cyclic shifts begins with cyclic shift $0$, or where the preamble cyclic shift selection begins from cyclic shift $0$ and, at each selection, the availability of corresponding cyclic shifts for the timing uncertainty window and its frequency cyclic shift pairs are tested and, if available, are reserved, and where the selection of a next preamble cyclic shift begins from the next available cyclic shift.

The exemplary embodiments of this invention further provide a method, apparatus and computer program product(s) for use at the receiver of the RACH preamble, or other synchronization or reference signal that is based on the Zadoff-Chu sequences, where the correlation values of the cyclic shift triplet are combined one of coherently or non-coherently, and where a detection threshold is adjusted based on the comparison of cyclic shift triplet correlation values at tentatively detected peaks.

The exemplary embodiments of this invention further provide a method, apparatus and computer program product(s) for use at a network node that comprises means for allocating RACH (or other) signature resources into cells of the network in a controlled manner, where signature resources are selected so as limit the cyclic shifts of sequence $a_u(k)$ that can be used as a preamble such that the frequency cyclic shift pairs of each timing uncertainty window element are not in the timing uncertainty window of any preamble, and such that the frequency cyclic shift of −1 of each timing uncertainty window element is different from the frequency cyclic shifts of +1 of all timing uncertainty window elements.

Further exemplary embodiments of the invention are described below. These exemplary embodiments may be utilized in conjunction with, or apart from, the above-described exemplary embodiments as they relax the cyclic shift limitations of the Zadoff-Chu CAZAC sequence so that:

(1) the frequency cyclic shift pairs of each timing uncertainty window element are not in timing uncertainty window of any RACH preamble and, in addition (2) the −1 frequency cyclic shift of each timing uncertainty window element is different from the +1 frequency cyclic shifts and −1 frequency cyclic shifts of timing uncertainty window elements corresponding to different preambles.

(3) Further, the −1 frequency cyclic shift of each timing uncertainty window element is separated by at least a cyclic shift offset of $c_{OL}$ from the +1 frequency cyclic shifts of the same element of the same preamble.

In other words, in conjunction with these further exemplary embodiments, the timing uncertainty windows of all allowed preamble cyclic shifts are separate from the corresponding sets of frequency cyclic shift pairs. Also the frequency cyclic shifts of −1 of timing uncertainty window elements are separate from the frequency cyclic shifts of +1 and −1 of timing uncertainty window elements of different preambles. However, the timing uncertainty windows corresponding to the frequency cyclic shifts of +/−1 of the same preamble are allowed to overlap up to cyclic shift offsets of $c_{OL}$.

The use of cyclic shifts of a single sequence according to conventional practice are illustrated in FIG. 1, where such cases are accommodated by the use of the exemplary embodiments of this invention.

Figure 7:
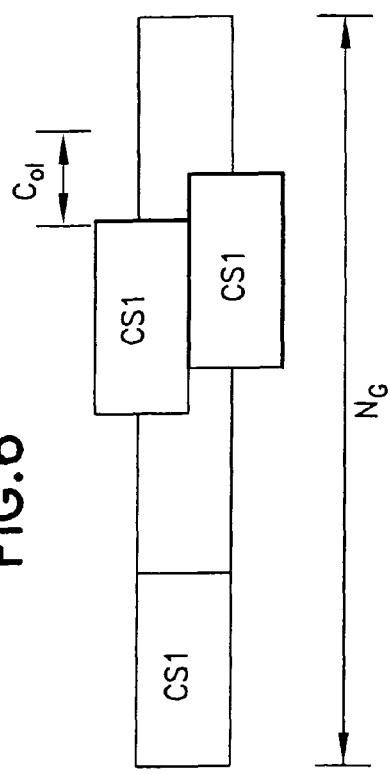
FIG. 7 illustrates relaxed cyclic shift limitations, where the frequency cyclic shifts of timing uncertainty windows are allowed to overlap.

A case where the −1 and +1 frequency cyclic shifts of timing uncertainty windows overlap in illustrated in FIG. 7. The relaxed cyclic shift limitations allow the use of such a preamble, whereas the original limitations would not allow the use of such a cyclic shift and would prevent the use of corresponding sequence index u in general. Note that none of the preambles in FIG. 7 would be allowed without the relaxation on the cyclic shift limitations that is made possible by the use of the exemplary embodiments of this invention.

It should be noted that in principle the cyclic shift limitations can be relaxed further by relaxing condition (2) above to be similar to condition (3). In other words, the frequency cyclic shifts of timing uncertainty windows of different preambles are also allowed to overlap up to a cyclic shift offset $c_{OL2}$.

The use of the exemplary embodiments of this invention also enables the receiver to make decisions on the existence and sign of the frequency offset by comparing the correlation values in the timing uncertainty window to the correlation values on the corresponding frequency cyclic shift pairs. The decision may be utilized on the signal timing and power estimation of detected RACH preamble.

Figure 9:
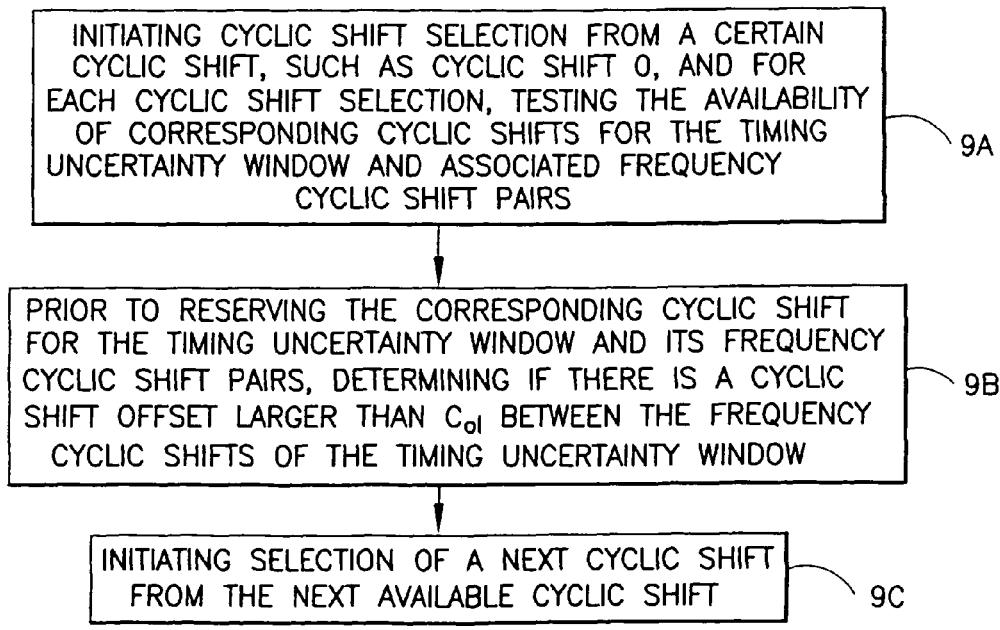
FIG. 9 is a logic flow diagram that is illustrative of an exemplary method, and the execution of an exemplary computer program product, to select cyclic shifts for a RACH preamble.

Referring to FIG. 9, the selection of cyclic shifts for the RACH preamble may proceed as follows:

Block 9A: The preamble cyclic shift selection is started from, e.g., cyclic shift 0. At each selection, the availability of corresponding cyclic shifts for the timing uncertainty window and its frequency cyclic shift pairs are tested.

Block 9B: Prior to reserving the corresponding cyclic shifts for the timing uncertainty window and its frequency cyclic shift pairs, a test is made to determine if there is a cyclic shift offset larger than $c_{OL}$ between the frequency cyclic shifts of the timing uncertainty window.

Block 9C: Selection of a next preamble cyclic shift is begun from the next available cyclic shift. The cyclic shift offset $c_{OL}$ that is used is preferably made larger than the expected channel delay spreads. For example, $c_{OL}$ may correspond to a delay of 10 us or 20 us.

At the receiver, three correlation value sets are used:

$1^{st}$ set: correlation values on the timing uncertainty windows $2^{nd}$ set: correlation values on the timing uncertainty windows combined with the correlation values on the corresponding frequency cyclic shifts of +1.

$3^{rd}$ set: correlation values on the timing uncertainty windows combined with the correlation values on the corresponding frequency cyclic shifts of −1.

The combination can be performed either coherently or non-coherently. The detection threshold may be also adjusted based on the comparison of correlation values on the different sets at tentatively detected peaks. After preamble detection, a decision is made on the existence and sign of the frequency offset by comparing the correlation values in the timing uncertainty window to the correlation values on the corresponding frequency cyclic shift pairs.

Figure 10A:
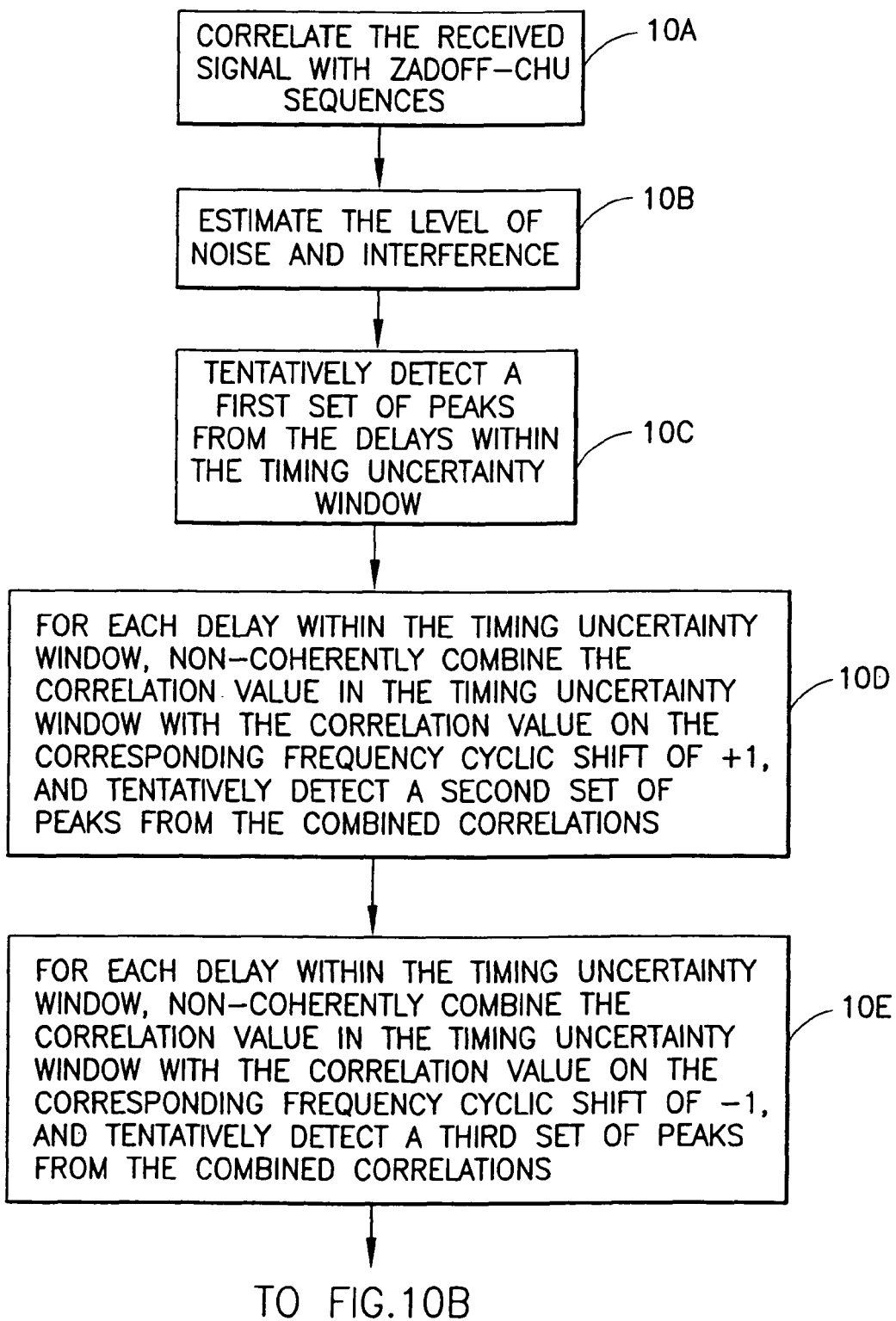
Figure 10B:
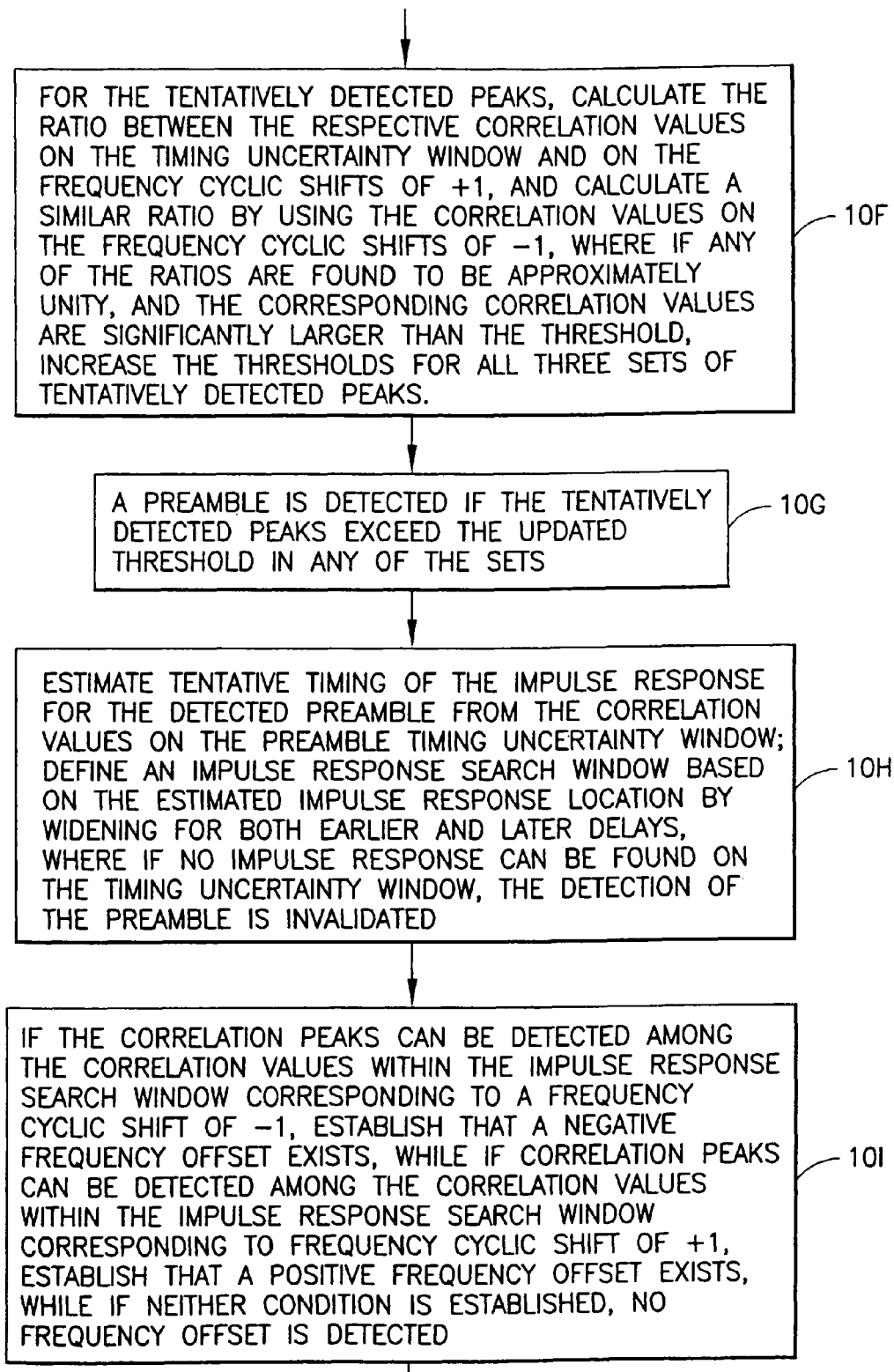

Referring to FIG. 10, an exemplary procedure may include the following steps:

Block 10A: Correlate the received signal with Zadoff-Chu sequences.

Block 10B: Estimate the level of noise and interference.

Block 10C: Tentatively detect a first set of peaks from the delays within the timing uncertainty window.

Block 10D: For each delay within timing uncertainty window, non-coherently combine the correlation value in the timing uncertainty window with the correlation value on the corresponding frequency cyclic shift of +1, and tentatively detect a second set of peaks from the combined correlations.

Block 10E: For each delay within the timing uncertainty window, non-coherently combine the correlation value in the timing uncertainty window with the correlation value on the corresponding frequency cyclic shift of −1, and tentatively detect a third set of peaks from the combined correlations.

Block 10F: For the tentatively detected peaks, calculate the ratio between the respective correlation values on the timing uncertainty window and on the frequency cyclic shifts of +1. A similar ratio is also calculated by using the correlation values on the frequency cyclic shifts of −1. If any of the ratios are found to be approximately unity (1), and the corresponding correlation values are significantly larger than the threshold, the thresholds are increased for all three sets of tentatively detected peaks.

Block 10G: A preamble is detected if the tentatively detected peaks exceed the updated threshold in any of the sets.

Block 10H: The tentative timing of the impulse response for the detected preamble is estimated from the correlation values on the preamble timing uncertainty window. An impulse response search window is defined based on the estimated impulse response location by widening it further for both earlier and later delays. It should be noted that the width of the impulse response search window should be less than $c_{OL}$. If no impulse response can be found on the timing uncertainty window, the detection of the preamble is invalidated.

Block 10I: If the correlation peaks can be detected among the correlation values within the impulse response search window corresponding to a frequency cyclic shift of −1, it is established that a negative frequency offset exists. If correlation peaks can be detected among the correlation values within the impulse response search window corresponding to frequency cyclic shift of +1, it is established that a positive frequency offset exists. If neither of these conditions are established, no frequency offset is detected.

Block 10J: If a negative frequency offset was established, the $3^{rd}$ set of correlation values is used in the final timing and received signal power estimation. If a positive frequency offset was established, the $2^{nd}$ set of correlation values is used instead, and if no frequency offset was established, the $1^{st}$ set is used.

Figure 8:
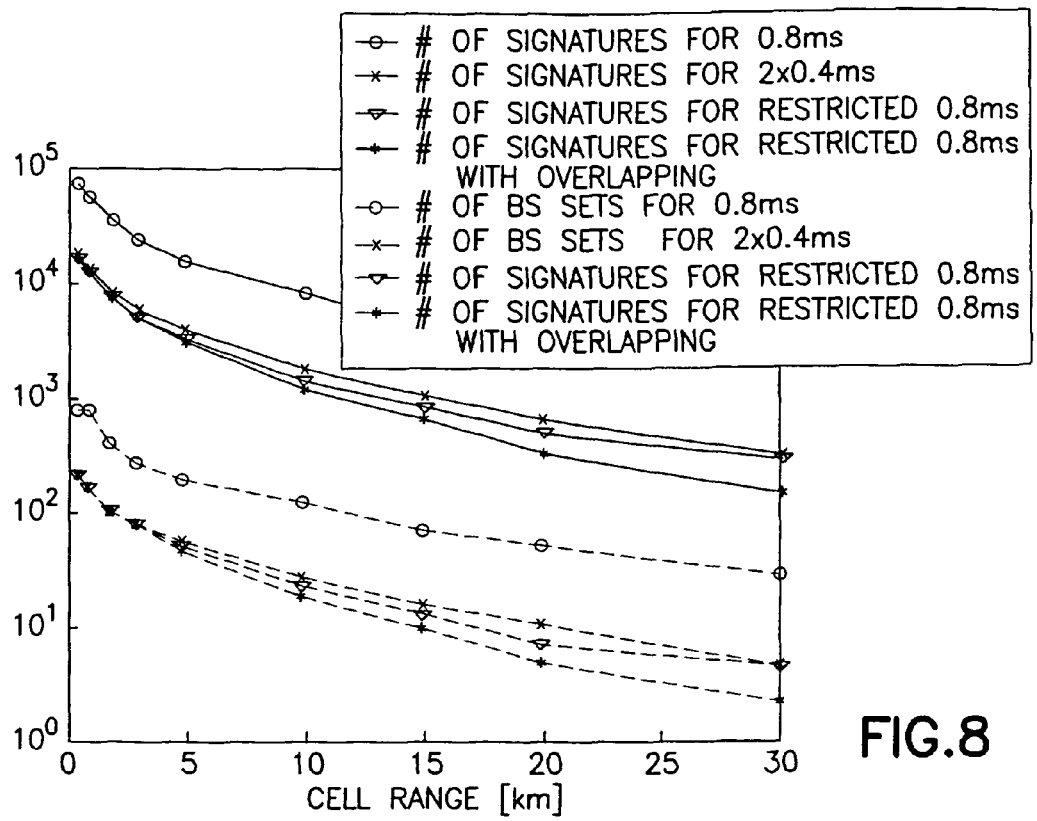
FIG. 8 is a graph depicting a number of RACH preamble sequences and a number of base station sets containing 64 RACH preambles.

The use of the exemplary embodiments of this invention increases the number of RACH preambles available in environments of interest, such as those with high velocity terminals. Thus, the RACH preamble reuse factor is beneficially increased in such environments (e.g., it may double it for a 30 km cell range). This is illustrated in FIG. 8.

It should be noted that the detection and timing estimation performance may be somewhat reduced with large frequency offsets. However, it can be expected that a performance degradation becomes evident at UE 10 velocities of around 200 km/h and above. Thus, the use of the exemplary embodiments of this invention supports significantly larger UE 10 velocities than does a 0.8 ms RACH sequence without any cyclic shift limitations. Additionally, the use of the exemplary embodiments of this invention does not increase false alarm probabilities, as compared to the prior cyclic shift limitations.

Based on the foregoing it should be apparent that the exemplary embodiments of this invention also provide a method, apparatus and computer program product(s) to select cyclic shifts, such as for a preamble, by performing steps and operations of: initiating cyclic shift selection from a certain cyclic shift, such as cyclic shift 0; for each cyclic shift selection, testing the availability of corresponding cyclic shifts for the timing uncertainty window and associated frequency cyclic shift pairs; prior to reserving the corresponding cyclic shift for the timing uncertainty window and its frequency cyclic shift pairs, determining if there is a cyclic shift offset larger than $c_{OL}$ between the frequency cyclic shifts of the timing uncertainty window; and initiating selection of a next cyclic shift from the next available cyclic shift.

The method, apparatus and computer program product as in the previous paragraph, where a cyclic shift offset $c_{OL}$ that is used is larger than an expected channel delay spreads.

The method, apparatus and computer program product as in the previous paragraphs, where the preamble is a RACH preamble.

The method, apparatus and computer program product as in the previous paragraphs, executed in a communication node of an E-UTRAN wireless communication system.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 11:
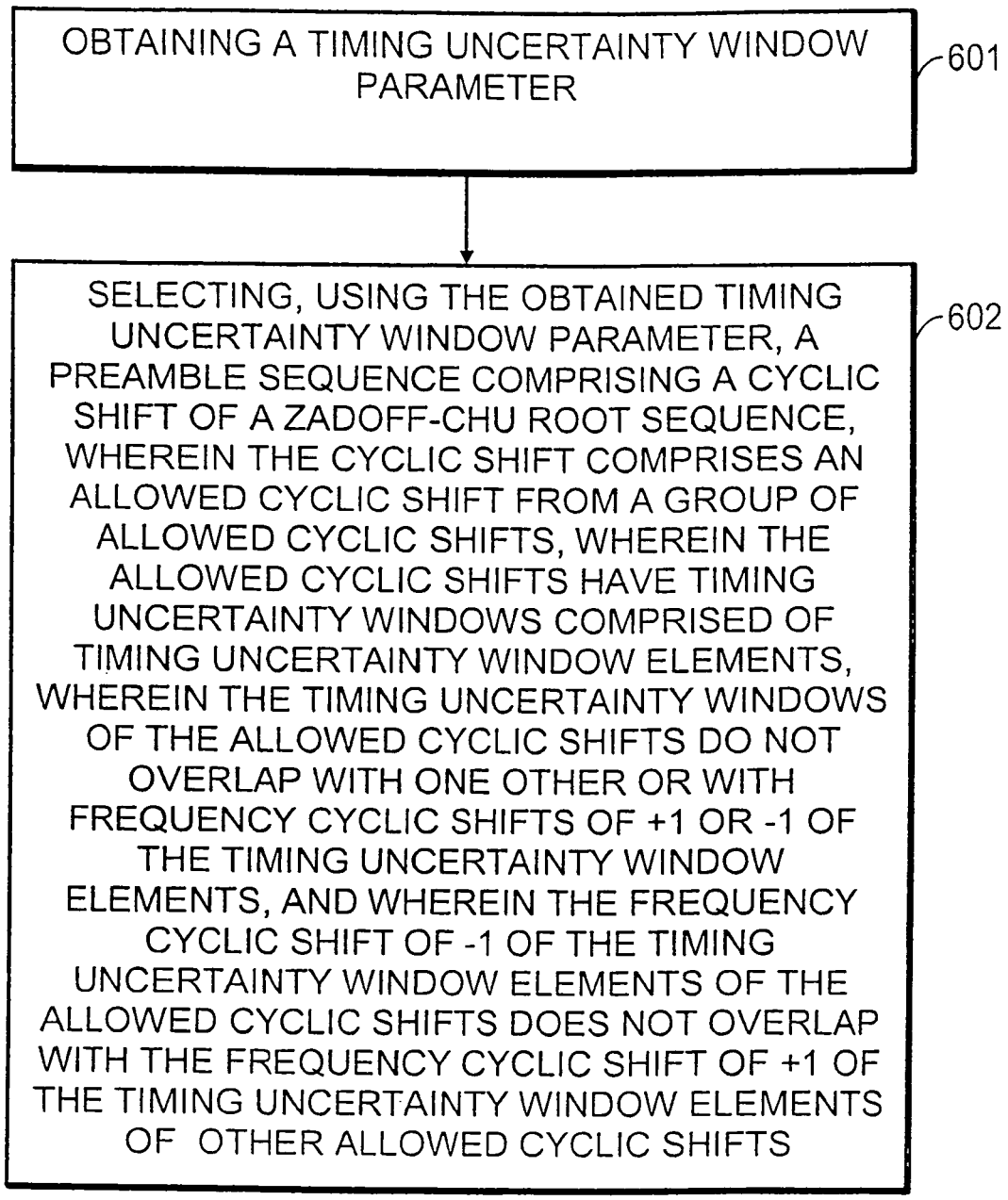
FIG. 11 depicts a flowchart illustrating another non-limiting example of a method and computer program for practicing the exemplary embodiments of this invention.

(1) In one exemplary embodiment, and as shown in FIG. 11, a method comprising: obtaining a timing uncertainty window parameter (601); and selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts (602).

As non-limiting examples, the timing uncertainty window parameter may comprise a width of the timing uncertainty window (e.g., a value referred to as D, a value referred to as $N_{CS}$), an index indicative of the width of the timing uncertainty window (e.g., a logical index of $N_{CS}$), an index indicative of another aspect or attribute of the timing uncertainty window, or any combination thereof. The width of the timing uncertainty window may be cell-specific and/or related to cell range. As a non-limiting example, the timing uncertainty window parameter may be transmitted from a base station to a mobile terminal in the system information.

A method as in any above, wherein the frequency cyclic shifts of −1 of the timing uncertainty window elements of the allowed cyclic shifts are separate from the frequency cyclic shift of +1 of the timing uncertainty window elements of a same preamble sequence. A method as in any above, wherein the −1 frequency cyclic shift of a timing uncertainty window element is separated by at least a cyclic shift offset from the +1 frequency cyclic shift of the timing uncertainty window element of a same preamble sequence. A method as in any above, wherein the frequency cyclic shift of +1 or −1 of a particular cyclic shift is given by a cyclic shift offset $+c_{off}$ or $-c_{off}$ where $c_{off}=(N_G m-1)/u$, where $N_G$ is a length of the preamble sequence, u is a root sequence index, and m is a smallest positive integer for which $c_{off}$ is an integer. A method as in any above, wherein the group of allowed cyclic shifts is formed by selecting cyclic shifts in accordance with one of the above from a candidate list containing cyclic shifts 0, D, 2D, 3D, . . . , and beginning the selection of the cyclic shifts with cyclic shift 0, wherein D comprises a width of the timing uncertainty window.

A method as in any above, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift. A method as in any above, further comprising obtaining an index, wherein selecting the preamble sequence comprises using the obtained index by calculating available cyclic shifts and adding new consecutive indexes until a total number of sequences equals a predetermined value. A method as in any above, further comprising: receiving a signal; correlating the received signal with the selected preamble sequence to obtain correlation values; and employing the correlation values of corresponding frequency cyclic shifts of −1 and +1 and the correlation values in the timing uncertainty window in a preamble detection process.

A method as in any above, further comprising: transmitting a message comprising the selected preamble sequence. A method as in the previous, wherein the transmitted message comprises a random access channel transmission. A method as in the previous, wherein the message is transmitted from a mobile terminal to a base station in a wireless communication system. A method as in the previous, wherein the wireless communication system comprises an evolved universal terrestrial radio access network. A method as in any above, wherein the method is implemented by a computer program.

(2) In another exemplary embodiment, a program storage device readable by a machine, tangibly embodying a program of instructions executable by the machine for performing operations, said operations comprising: obtaining a timing uncertainty window parameter (601); and selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts (602).

A program storage device as in any above, wherein the frequency cyclic shifts of −1 of the timing uncertainty window elements of the allowed cyclic shifts are separate from the frequency cyclic shift of +1 of the timing uncertainty window elements of a same preamble sequence. A program storage device as in any above, wherein the −1 frequency cyclic shift of a timing uncertainty window element is separated by at least a cyclic shift offset from the +1 frequency cyclic shift of the timing uncertainty window element of a same preamble sequence. A program storage device as in any above, wherein the frequency cyclic shift of +1 or −1 of a particular cyclic shift is given by a cyclic shift offset $+c_{off}$ or $-c_{off}$, where $c_{off}=(N_G m-1)/u$, where $N_G$ is a length of the preamble sequence, u is a root sequence index, and m is a smallest positive integer for which $c_{off}$ is an integer. A program storage device as in any above, wherein the group of allowed cyclic shifts is formed by selecting cyclic shifts in accordance with one of the above from a candidate list containing cyclic shifts 0, D, 2D, 3D, . . . , and beginning the selection of the cyclic shifts with cyclic shift 0, wherein D comprises a width of the timing uncertainty window.

A program storage device as in any above, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift. A program storage device as in any above, said operations further comprising obtaining an index, wherein selecting the preamble sequence comprises using the obtained index by calculating available cyclic shifts and adding new consecutive indexes until a total number of sequences equals a predetermined value. A program storage device as in any above, said operations further comprising: receiving a signal; correlating the received signal with the selected preamble sequence to obtain correlation values; and employing the correlation values of corresponding frequency cyclic shifts of −1 and +1 and the correlation values in the timing uncertainty window in a preamble detection process.

A program storage device as in any above, said operations further comprising: transmitting a message comprising the selected preamble sequence. A program storage device as in the previous, wherein the transmitted message comprises a random access channel transmission. A program storage device as in the previous, wherein the message is transmitted from a mobile terminal to a base station in a wireless communication system. A program storage device as in the previous, wherein the wireless communication system comprises an evolved universal terrestrial radio access network. A program storage device as in any above, wherein the machine comprises a mobile terminal, a mobile phone, a mobile node, or a cellular phone.

(3) In another exemplary embodiment, an apparatus (10) comprising: a receiver (10D) configured to receive a timing uncertainty window parameter; and a processor (10A) configured to select, using the received timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

An apparatus as in any above, wherein the frequency cyclic shifts of −1 of the timing uncertainty window elements of the allowed cyclic shifts are separate from the frequency cyclic shift of +1 of the timing uncertainty window elements of a same preamble sequence. An apparatus as in any above, wherein the −1 frequency cyclic shift of a timing uncertainty window element is separated by at least a cyclic shift offset from the +1 frequency cyclic shift of the timing uncertainty window element of a same preamble sequence. An apparatus as in any above, wherein the frequency cyclic shift of +1 or −1 of a particular cyclic shift is given by a cyclic shift offset +$c_{off}$ or −$c_{off}$, where $c_{off}$=($N_G$m−1)/u, where $N_G$ is a length of the preamble sequence, u is a root sequence index, and m is a smallest positive integer for which $c_{off}$ is an integer. An apparatus as in any above, wherein the group of allowed cyclic shifts is formed by selecting cyclic shifts in accordance with one of the above from a candidate list containing cyclic shifts 0, D, 2D, 3D, . . . , and beginning the selection of the cyclic shifts with cyclic shift 0, wherein D comprises a width of the timing uncertainty window.

An apparatus as in any above, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift. An apparatus as in any above, wherein the receiver is further configured to receive an index, wherein selecting the preamble sequence comprises using the received index by calculating available cyclic shifts and adding new consecutive indexes until a total number of sequences equals a predetermined value. An apparatus as in any above, wherein the receiver is further configured to receive a signal, wherein the processor is further configured to correlate the received signal with the selected preamble sequence to obtain correlation values and to employ the correlation values of corresponding frequency cyclic shifts of −1 and +1 and the correlation values in the timing uncertainty window in a preamble detection process.

An apparatus as in any above, further comprising a transmitter configured to transmit a message comprising the selected preamble sequence. An apparatus as in the previous, wherein the transmitted message comprises a random access channel transmission. An apparatus as in the previous, wherein the message is transmitted to a base station in a wireless communication system. An apparatus as in the previous, wherein the wireless communication system comprises an evolved universal terrestrial radio access network. An apparatus as in any above, wherein the apparatus comprises a mobile terminal, a mobile phone, a mobile node, or a cellular phone. An apparatus as in any above, further comprising a memory configured to store the selected preamble sequence.

(4) In another exemplary embodiment, an apparatus comprising: means for obtaining a timing uncertainty window parameter; and means for selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

An apparatus as in any above, wherein the frequency cyclic shifts of −1 of the timing uncertainty window elements of the allowed cyclic shifts are separate from the frequency cyclic shift of +1 of the timing uncertainty window elements of a same preamble sequence. An apparatus as in any above, wherein the −1 frequency cyclic shift of a timing uncertainty window element is separated by at least a cyclic shift offset from the +1 frequency cyclic shift of the timing uncertainty window element of a same preamble sequence. An apparatus as in any above, wherein the frequency cyclic shift of +1 or −1 of a particular cyclic shift is given by a cyclic shift offset +$c_{off}$ or −$c_{off}$, where $c_{off}$=($N_G$m−1)/u, where $N_G$ is a length of the preamble sequence, u is a root sequence index, and m is a smallest positive integer for which $c_{off}$ is an integer. An apparatus as in any above, wherein the group of allowed cyclic shifts is formed by selecting cyclic shifts in accordance with one of the above from a candidate list containing cyclic shifts 0, D, 2D, 3D, . . . , and beginning the selection of the cyclic shifts with cyclic shift 0, wherein D comprises a width of the timing uncertainty window.

An apparatus as in any above, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift. An apparatus as in any above, further comprising means for obtaining an index, wherein selecting the preamble sequence comprises using the obtained index by calculating available cyclic shifts and adding new consecutive indexes until a total number of sequences equals a predetermined value. An apparatus as in the previous, wherein the means for obtaining comprises a receiver. An apparatus as in any above, further comprising means for receiving a signal, means for correlating the received signal with the selected preamble sequence to obtain correlation values, and means for employing the correlation values of corresponding frequency cyclic shifts of −1 and +1 and the correlation values in the timing uncertainty window in a preamble detection process. An apparatus as in the previous, wherein the means for receiving comprises a receiver and the means for correlating and the means for employing comprise a processor.

An apparatus as in any above, further comprising means for transmitting a message comprising the selected preamble sequence. An apparatus as in the previous, wherein the transmitted message comprises a random access channel transmission. An apparatus as in the previous, wherein the message is transmitted to a base station in a wireless communication system. An apparatus as in the previous, wherein the wireless communication system comprises an evolved universal terrestrial radio access network. An apparatus as in any of the above, wherein the means for transmitting comprises a transmitter. An apparatus as in any above, wherein the apparatus comprises a mobile terminal, a mobile phone, a mobile node, or a cellular phone. An apparatus as in any above, wherein the means for obtaining comprises a receiver and the means for selecting comprises a processor. An apparatus as in any above, further comprising means for storing the selected preamble sequence. An apparatus as in the previous, wherein the means for storing comprises a memory.

(5) In another exemplary embodiment, an apparatus comprising: a processor configured to select, using a timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts; and a memory configured to store the selected preamble sequence. An apparatus as in the previous, further comprising one or more additional aspects of the various exemplary embodiments described herein.

Figure 12:
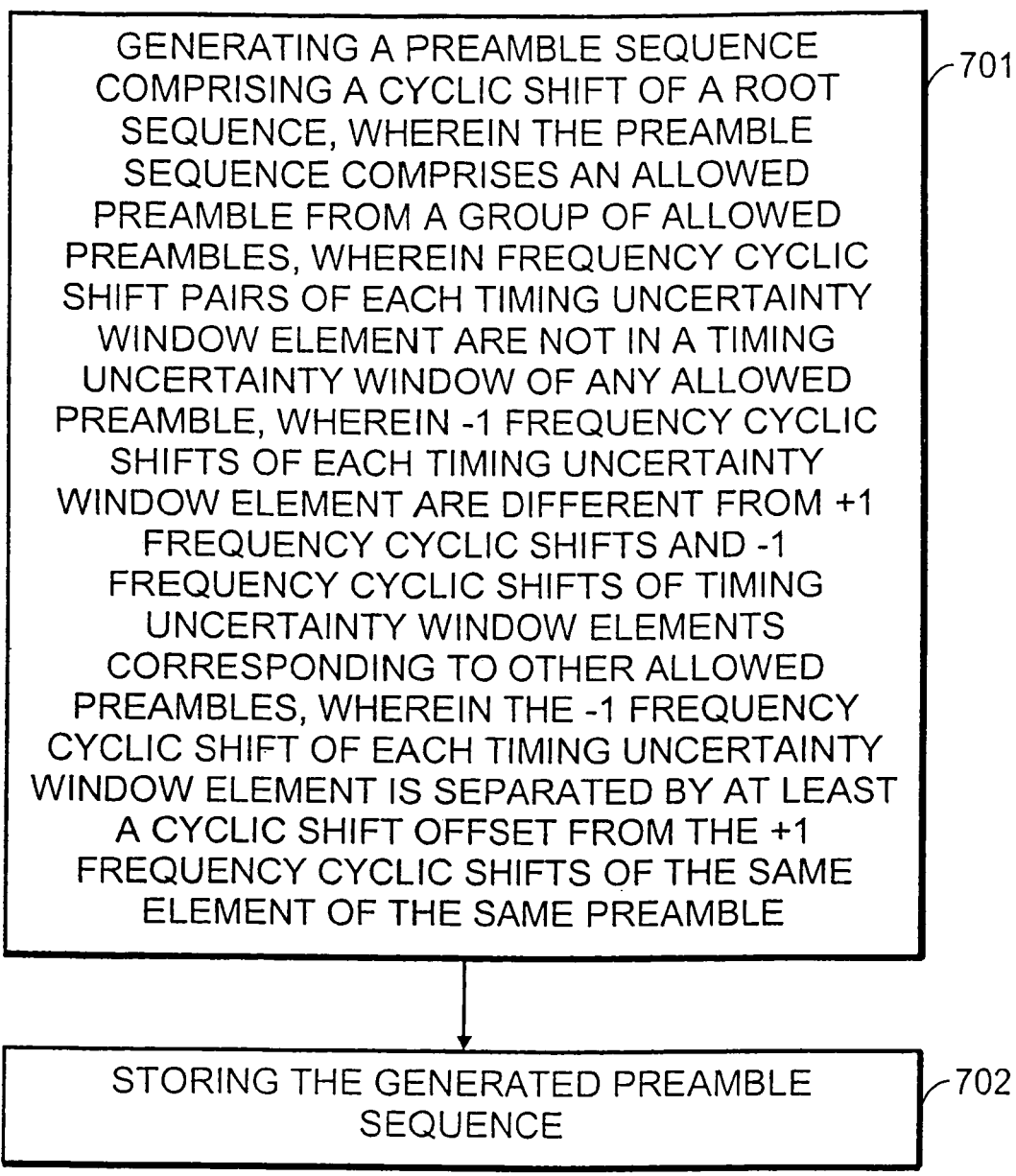
FIG. 12 depicts a flowchart illustrating another non-limiting example of a method and computer program for practicing the exemplary embodiments of this invention.

(6) In another exemplary embodiment, and as shown in FIG. 12, a method comprising: generating a preamble sequence comprising a cyclic shift of a root sequence, wherein the preamble sequence comprises an allowed preamble from a group of allowed preambles, wherein frequency cyclic shift pairs of each timing uncertainty window element are not in a timing uncertainty window of any allowed preamble, wherein −1 frequency cyclic shifts of each timing uncertainty window element are different from +1 frequency cyclic shifts and −1 frequency cyclic shifts of timing uncertainty window elements corresponding to other allowed preambles, wherein the −1 frequency cyclic shift of each timing uncertainty window element is separated by at least a cyclic shift offset from the +1 frequency cyclic shifts of the same element of the same preamble (701); and storing the generated preamble sequence (702).

(7) In another exemplary embodiment, a program storage device readable by a machine, tangibly embodying a program of instructions executable by the machine for performing operations, said operations comprising: generating a preamble sequence comprising a cyclic shift of a root sequence, wherein the preamble sequence comprises an allowed preamble from a group of allowed preambles, wherein frequency cyclic shift pairs of each timing uncertainty window element are not in a timing uncertainty window of any allowed preamble, wherein −1 frequency cyclic shifts of each timing uncertainty window element are different from +1 frequency cyclic shifts and −1 frequency cyclic shifts of timing uncertainty window elements corresponding to other allowed preambles, wherein the −1 frequency cyclic shift of each timing uncertainty window element is separated by at least a cyclic shift offset from the +1 frequency cyclic shifts of the same element of the same preamble; and storing the generated preamble sequence.

(8) In another exemplary embodiment, an apparatus comprising: a processor configured to generate a preamble sequence comprising a cyclic shift of a root sequence, wherein the preamble sequence comprises an allowed preamble from a group of allowed preambles, wherein frequency cyclic shift pairs of each timing uncertainty window element are not in a timing uncertainty window of any allowed preamble, wherein −1 frequency cyclic shifts of each timing uncertainty window element are different from +1 frequency cyclic shifts and −1 frequency cyclic shifts of timing uncertainty window elements corresponding to other allowed preambles, wherein the −1 frequency cyclic shift of each timing uncertainty window element is separated by at least a cyclic shift offset from the +1 frequency cyclic shifts of the same element of the same preamble; and a memory configured to store the generated preamble sequence.

(9) In another exemplary embodiment, an apparatus comprising: means for generating a preamble sequence comprising a cyclic shift of a root sequence, wherein the preamble sequence comprises an allowed preamble from a group of allowed preambles, wherein frequency cyclic shift pairs of each timing uncertainty window element are not in a timing uncertainty window of any allowed preamble, wherein −1 frequency cyclic shifts of each timing uncertainty window element are different from +1 frequency cyclic shifts and −1 frequency cyclic shifts of timing uncertainty window elements corresponding to other allowed preambles, wherein the −1 frequency cyclic shift of each timing uncertainty window element is separated by at least a cyclic shift offset from the +1 frequency cyclic shifts of the same element of the same preamble; and means for storing the generated preamble sequence. In other exemplary embodiments, the means for generating comprises a processor and the means for storing comprises a memory.

Figure 13:
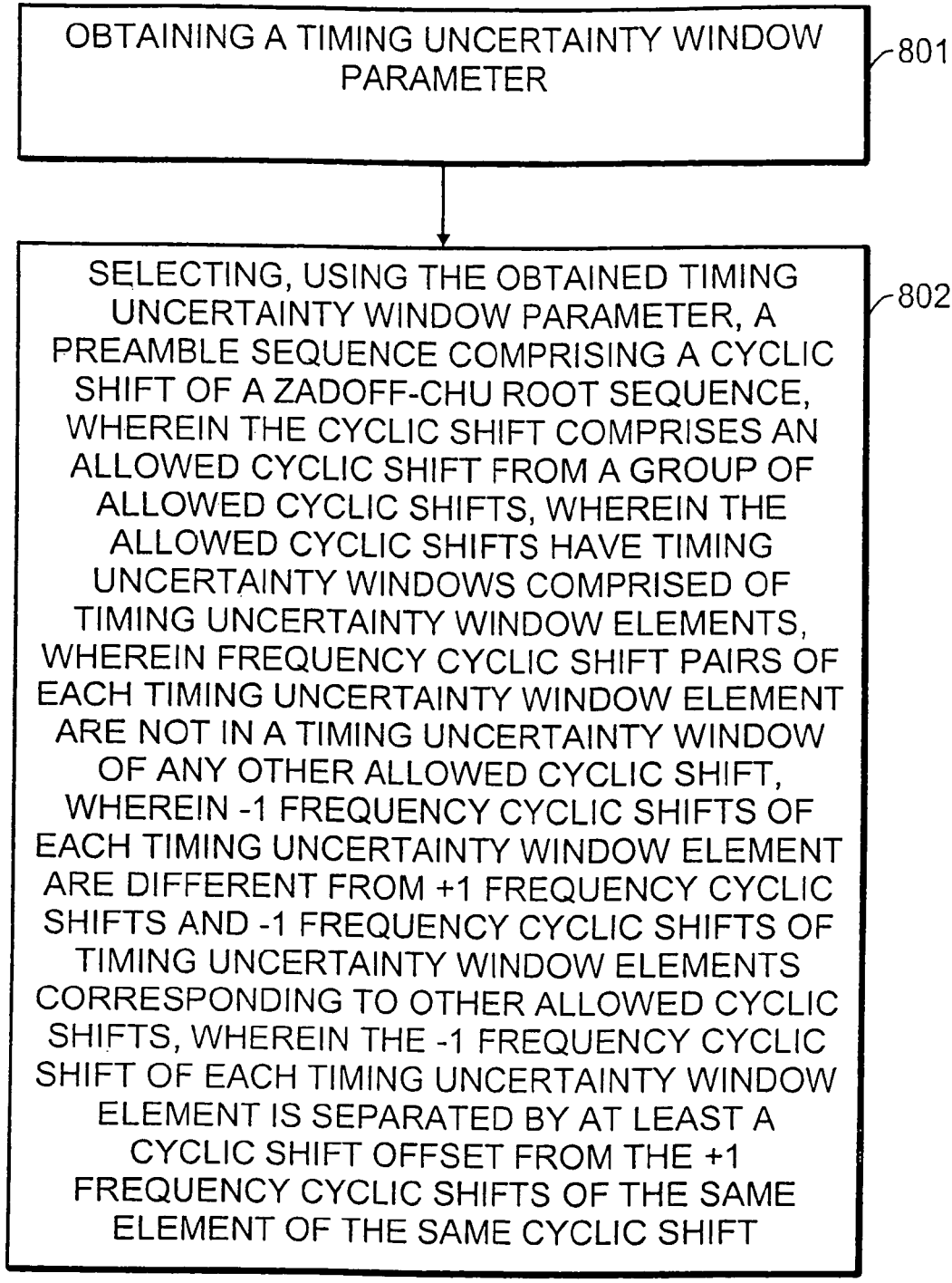
FIG. 13 depicts a flowchart illustrating another non-limiting example of a method and computer program for practicing the exemplary embodiments of this invention.

(10) In another exemplary embodiment, and as shown in FIG. 13, a method comprising: obtaining a timing uncertainty window parameter (801); and selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein frequency cyclic shift pairs of each timing uncertainty window element are not in a timing uncertainty window of any other allowed cyclic shift, wherein −1 frequency cyclic shifts of each timing uncertainty window element are different from +1 frequency cyclic shifts and −1 frequency cyclic shifts of timing uncertainty window elements corresponding to other allowed cyclic shifts, wherein the −1 frequency cyclic shift of each timing uncertainty window element is separated by at least a cyclic shift offset from the +1 frequency cyclic shifts of the same element of the same cyclic shift (802).

The method depicted in FIG. 13 may be implemented as a computer program or by an apparatus, similar to the above-recited additional exemplary embodiments of the invention.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention. For example, while discussed herein as relating to obtaining (e.g., receiving) the timing uncertainty window parameter (e.g., via a transmission from a base station), the exemplary embodiments of the invention are not limited thereto. As a non-limiting example, the timing uncertainty window parameter may be obtained via other methods or components, such as by retrieving it from a memory, for example, if the UE is connecting to a Node-B it has recently connected to before (e.g., within a predefined time interval). Those of ordinary skill in the art will appreciate that other such and similar modifications are possible and further enable practice of the exemplary embodiments of the invention.

For example, while the exemplary embodiments have been described above in the context of the UTRAN-LTE (E-UTRAN) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
obtaining a timing uncertainty window parameter; and
selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

2. A method as in claim 1, wherein the frequency cyclic shifts of −1 of the timing uncertainty window elements of the allowed cyclic shifts are separate from the frequency cyclic shift of +1 of the timing uncertainty window elements of a same preamble sequence.

3. A method as in claim 1, wherein the −1 frequency cyclic shift of a timing uncertainty window element is separated by at least a cyclic shift offset from the +1 frequency cyclic shift of the timing uncertainty window element of a same preamble sequence.

4. A method as in claim 2, wherein the frequency cyclic shift of +1 or −1 of a particular cyclic shift is given by a cyclic shift offset $+c_{off}$ or $-c_{off}$, where $c_{off}=(N_G m-1)/u$, where $N_G$ is a length of the preamble sequence, u is a root sequence index, and m is a smallest positive integer for which $c_{off}$ is an integer.

5. A method as in claim 2, wherein the group of allowed cyclic shifts is formed by selecting cyclic shifts in accordance with claim 2 or 3 from a candidate list containing cyclic shifts 0, D, 2D, 3D, . . . , and beginning the selection of the cyclic shifts with cyclic shift 0, wherein D comprises a width of the timing uncertainty window.

6. A method as in claim 2, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift.

7. A method as in claim 1, further comprising obtaining an index, wherein selecting the preamble sequence comprises using the obtained index by calculating available cyclic shifts and adding new consecutive indexes until a total number of sequences equals a predetermined value.

8. A method as in claim 1, wherein obtaining the timing uncertainty window parameter comprises receiving, by a mobile terminal, the timing uncertainty window parameter from a base station in a wireless communication system.

9. A method as in claim 1, further comprising: receiving a signal; correlating the received signal with the selected preamble sequence to obtain correlation values; and employing the correlation values of corresponding frequency cyclic shifts of −1 and +1 and the correlation values in the timing uncertainty window in a preamble detection process.

10. A method as in claim 1, further comprising: transmitting a message comprising the selected preamble sequence.

11. A method as in claim 10, wherein the transmitted message comprises a random access channel transmission.

12. A method as in claim 11, wherein the message is transmitted from a mobile terminal to a base station in a wireless communication system.

13. A method as in claim 12, wherein the wireless communication system comprises an evolved universal terrestrial radio access network.

14. A program storage device readable by a machine, tangibly embodying a program of instructions executable by the machine for performing operations, said operations comprising:
obtaining a timing uncertainty window parameter; and
selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

15. A program storage device as in claim 14, wherein the frequency cyclic shifts of −1 of the timing uncertainty window elements of the allowed cyclic shifts are separate from the frequency cyclic shift of +1 of the timing uncertainty window elements of a same preamble sequence.

16. A program storage device as in claim 14, wherein the −1 frequency cyclic shift of a timing uncertainty window element is separated by at least a cyclic shift offset from the +1 frequency cyclic shift of the timing uncertainty window element of a same preamble sequence.

17. A program storage device as in claim 15, wherein the frequency cyclic shift of +1 or −1 of a particular cyclic shift is given by a cyclic shift offset $+c_{off}$ or $-c_{off}$, where $c_{off}=(N_G m-1)/u$, where $N_G$ is a length of the preamble sequence, u is a root sequence index, and m is a smallest positive integer for which $c_{off}$ is an integer.

18. A program storage device as in claim 15, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift.

19. A program storage device as in claim 14, said operations further comprising obtaining an index, wherein selecting the preamble sequence comprises using the obtained index by calculating available cyclic shifts and adding new consecutive indexes until a total number of sequences equals a predetermined value.

20. A program storage device as in claim 14, wherein the machine comprises a mobile terminal.

21. An apparatus comprising:
a receiver configured to receive a timing uncertainty window parameter; and
a processor configured to select, using the received timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

22. An apparatus as in claim 21, wherein the frequency cyclic shifts of −1 of the timing uncertainty window elements of the allowed cyclic shifts are separate from the frequency cyclic shift of +1 of the timing uncertainty window elements of a same preamble sequence.

23. An apparatus as in claim 21, wherein the −1 frequency cyclic shift of a timing uncertainty window element is separated by at least a cyclic shift offset from the +1 frequency cyclic shift of the timing uncertainty window element of a same preamble sequence.

24. An apparatus as in claim 22, wherein the frequency cyclic shift of +1 or −1 of a particular cyclic shift is given by a cyclic shift offset $+c_{off}$ or $-c_{off}$, where $c_{off}=(N_G m-1)/u$, where $N_G$ is a length of the preamble sequence, u is a root sequence index, and m is a smallest positive integer for which $c_{off}$ is an integer.

25. An apparatus as in claim 22, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift.

26. An apparatus as in claim 21, wherein the receiver (10D) is further configured to receive an index, wherein selecting the preamble sequence comprises using the received index by calculating available cyclic shifts and adding new consecutive indexes until a total number of sequences equals a predetermined value.

27. An apparatus as in claim 21, wherein the apparatus comprises a mobile terminal.

28. An apparatus comprising:
means for obtaining a timing uncertainty window parameter; and
means for selecting, using the obtained timing uncertainty window parameter, a preamble sequence comprising a cyclic shift of a Zadoff-Chu root sequence, wherein the cyclic shift comprises an allowed cyclic shift from a group of allowed cyclic shifts, wherein the allowed cyclic shifts have timing uncertainty windows comprised of timing uncertainty window elements, wherein the timing uncertainty windows of the allowed cyclic shifts do not overlap with one other or with frequency cyclic shifts of +1 or −1 of the timing uncertainty window elements, and wherein the frequency cyclic shift of −1 of the timing uncertainty window elements of the allowed cyclic shifts does not overlap with the frequency cyclic shift of +1 of the timing uncertainty window elements of other allowed cyclic shifts.

29. An apparatus as in claim 28, wherein the frequency cyclic shifts of −1 of the timing uncertainty window elements of the allowed cyclic shifts are separate from the frequency cyclic shift of +1 of the timing uncertainty window elements of a same preamble sequence.

30. An apparatus as in claim 28, wherein the −1 frequency cyclic shift of a timing uncertainty window element is separated by at least a cyclic shift offset from the +1 frequency cyclic shift of the timing uncertainty window element of a same preamble sequence.

31. An apparatus as in claim 29, wherein the frequency cyclic shift of +1 or −1 of a particular cyclic shift is given by a cyclic shift offset $+c_{off}$ or $-c_{off}$, where $c_{off}=(N_G m-1)/u$, where $N_G$ is a length of the preamble sequence, u is a root sequence index, and m is a smallest positive integer for which $c_{off}$ is an integer.

32. An apparatus as in claim 29, wherein the group of allowed cyclic shifts is formed by beginning selection of the allowed cyclic shifts with cyclic shift 0, at each selection, by testing availability of corresponding cyclic shifts for the timing uncertainty window and its frequency cyclic shift pairs and, if available, adding the cyclic shift to the group of allowed cyclic shifts, and continuing the selection from a next available cyclic shift.

33. An apparatus as in claim 28, further comprising means for obtaining an index, wherein selecting the preamble sequence comprises using the obtained index by calculating available cyclic shifts and adding new consecutive indexes until a total number of sequences equals a predetermined value.

34. An apparatus as in claim 28, wherein the apparatus comprises a mobile terminal.

35. An apparatus as in claim 28, wherein the means for obtaining comprises a receiver and the means for selecting comprises a processor.

* * * * *